(12) United States Patent
Hope

(10) Patent No.: US 12,481,569 B2
(45) Date of Patent: Nov. 25, 2025

(54) DYNAMIC STORAGE RESILIENCY

(71) Applicant: Microsoft Technology Licensing, LLC, Redmond, WA (US)

(72) Inventor: Taylor Alan Hope, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/726,315

(22) PCT Filed: Dec. 20, 2022

(86) PCT No.: PCT/US2022/082052
§ 371 (c)(1),
(2) Date: Jul. 2, 2024

(87) PCT Pub. No.: WO2023/133038
PCT Pub. Date: Jul. 13, 2023

(65) Prior Publication Data
US 2025/0068527 A1    Feb. 27, 2025

(30) Foreign Application Priority Data
Jan. 4, 2022   (LU) .................................. LU501203

(51) Int. Cl.
G06F 11/20    (2006.01)
(52) U.S. Cl.
CPC .... G06F 11/2094 (2013.01); *G06F 2201/805* (2013.01)
(58) Field of Classification Search
CPC .............................. G06F 1/2094; G06F 1/2056
USPC .................................. 714/6.21, 6.2, 6.3, 6.1
See application file for complete search history.

(56) References Cited

U.S. PATENT DOCUMENTS

| 10,019,362 | B1 |   | 7/2018  | Chatterjee et al. |          |
|------------|----|---|---------|-------------------|----------|
| 11,513,729 | B1 | * | 11/2022 | Ben-Yehuda ......... | G06F 3/0656 |
| 2017/0132151 | A1 | * | 5/2017  | Bakke ..................... | G06F 13/28 |
| 2018/0018270 | A1 |   | 1/2018  | Kilaru et al.     |          |

(Continued)

FOREIGN PATENT DOCUMENTS

WO    2016004120 A2    1/2016

OTHER PUBLICATIONS

Search Report and Written Opinion issued in Luxembourg Application No. LU501203, Aug. 8, 2022, 10 pages.

(Continued)

*Primary Examiner* — Chae M Ko
(74) *Attorney, Agent, or Firm* — Workman Nydegger

(57) ABSTRACT

A computer system is configured to provision a plurality of storage volumes at a plurality of fault domains and thinly provision a plurality of cache volumes at the plurality of fault domains. The computer system is also configured to perform a write operation in a resilient manner that maintains a plurality of copies of data associated with the write operation. Performing the write operation in the resilient manner includes allocating a portion of storage in each of the plurality of cache volumes, and caching the data associated with the write operation in the portion of storage in each of the plurality of cache volumes. The cached data is then persistently stored in the plurality of storage volumes. After that, the portion of storage in each of the plurality of cache volumes is deallocated.

20 Claims, 10 Drawing Sheets

(56) References Cited

U.S. PATENT DOCUMENTS

| | | |
|---|---|---|
| 2020/0097449 A1 | 3/2020 | Islam et al. |
| 2021/0109673 A1* | 4/2021 | Kim .................... G06F 3/0653 |
| 2021/0279152 A1* | 9/2021 | Patel .................. G06F 11/2094 |
| 2022/0057958 A1* | 2/2022 | Patriarca ................ G06F 3/061 |

OTHER PUBLICATIONS

International Search Report and Written Opinion received for PCT Application No. PCT/US22/082052 Mar. 21, 2023, 17 pages.

* cited by examiner

DYNAMIC STORAGE RESILIENCY

CROSS-REFERENCE TO RELATED APPLICATIONS

The present application is a U.S. National Stage of International Application No. PCT/US2022/082052, filed on 20 Dec. 2022, designating the United States and claiming the priority of Luxembourg Patent Application No. LU501203 filed with the Luxembourg Intellectual Property Office on 4 Jan. 2022. All of the aforementioned applications are incorporated herein in their respective entirety by this reference.

BACKGROUND

Organizations maintain data centers to provide centralized data-processing capabilities. Data center infrastructure includes hardware components, such as computers, storage systems, and network devices; and software components, such as applications, operating systems, and management software.

Uninterrupted operation of data centers can be critical to the operation of a business. Organizations may need to have a reliable infrastructure that ensures that data is accessible at all times. In general, a data center should ensure the availability of information when required. Unavailability of information could cause financial loss to businesses, such as financial services, telecommunications, and e-commerce.

However, with disaggregated storage, it is inevitable that some storage may become temporarily unavailable from time to time. When some portions of storage are unavailable, write operations may be unable to reach all copies of data. As such, data resiliency may be degraded. If an organization wants to increase its data availability and/or resiliency, a greater level of redundancy is usually required. The organization will need to obtain additional storage to store the redundant copies of the data. As such, to achieve greater resiliency, additional resources are generally required.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Principles described herein are related to a computer system (e.g., a service computer system for providing a service to entities) configured to dynamically maintain storage resiliency using one or more thinly provisioned cache volumes. In embodiments, the computer system is configured to provision a plurality of storage volumes at a plurality of fault domains and thinly provision a plurality of cache volumes at the plurality of fault domains. The computer system is configured to perform a write operation in a resilient manner that maintains a plurality of copies of data associated with the write operation. Performing the write operation in the resilient manner includes, for each fault domain in the plurality of fault domains, allocating a portion of storage in a cache volume at the fault domain, and caching the data associated with the write operation in the portion of storage in the cache volume at the fault domain. The cached data is then persistently stored in a storage volume at the fault domain. After that, the portion of storage in the cache volume at the fault domain is deallocated.

Because the cache volume is thinly provisioned, storage in the cache volume is allocated on-demand. As a technical effect, the footprint of the cache during healthy operation of the system is reduced.

In some cases, one of the fault domains may be unavailable, causing a cache volume and/or a storage volume to be unavailable. In response to determining that at least one fault domain in the plurality of fault domains is unavailable, the computer system is configured to allocate an extra portion of storage in a particular cache volume at an available fault domain; and cache an extra copy of the data associated with the write operation in the extra portion of storage in the particular cache volume. In response to determining that the at least one fault domain becomes available, the cached data is persistently stored in a storage volume at the at least one fault domain. After that, the portion of storage in the particular cache volume is deallocated. As such, the embodiments provide a technical effect of only allocating additional cache storage at healthy fault domains during periods of storage unavailability, e.g., when some fault domains are unavailable.

In some embodiments, the computer system is also configured to receive a user input that configures a resilience policy. In some embodiments, the user input indicates that N copies of data are to be maintained for resilience, where N is a natural number that is greater than 1. In some embodiments, the user input further indicates that M copies of data are to be written during a write operation, where M is a natural number that is greater than 1. In some embodiments, the user input further indicates that a resiliency is R, where R is a natural number, as such when a total number of available storage volumes is fewer than M, one or more extra copies of data are cached to achieve the resiliency R. Such embodiments provide a technical effect of allowing the flexible settings of resilience policies based on the needs of applications.

Principles described herein are also related to a method implemented at a computer system for dynamically maintaining storage resiliency using one or more thinly provisioned cache volumes. The method includes provisioning a plurality of storage volumes at a plurality of fault domains, and thinly provisioning a plurality of cache volumes at the plurality of fault domains. The method also includes performing a write operation in a resilient manner that maintains a plurality of copies of data associated with the write operation. Performing the write operation in the resilient manner includes for each fault domain in the plurality of fault domains, allocating a portion of storage in a cache volume at the fault domain, and caching the data associated with the write operation in the portion of storage in the cache volume at the fault domain. The cached data is then persistently stored in a storage volume at the fault domain. After that, the portion of storage in the cache volume at the fault domain is deallocated, providing a technical effect of a higher resiliency without increasing total consumption of hardware resources.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Uninterrupted operation of data centers can be critical to the operation of a business. Organizations may need to have a reliable infrastructure that ensures that data is accessible at all times. In general, a data center should ensure the availability of information when required. Unavailability of information could cause financial loss to businesses, such as financial services, telecommunications, and e-commerce. However, with disaggregated storage, it is almost inevitable that some storage may become temporarily unavailable from time to time. When some portions of storage are unavailable, write operations may be unable to reach all copies of data. As such, data resiliency may be degraded. In existing data centers, to increase data availability and/or resiliency, additional resources are generally required.

Figure 1:
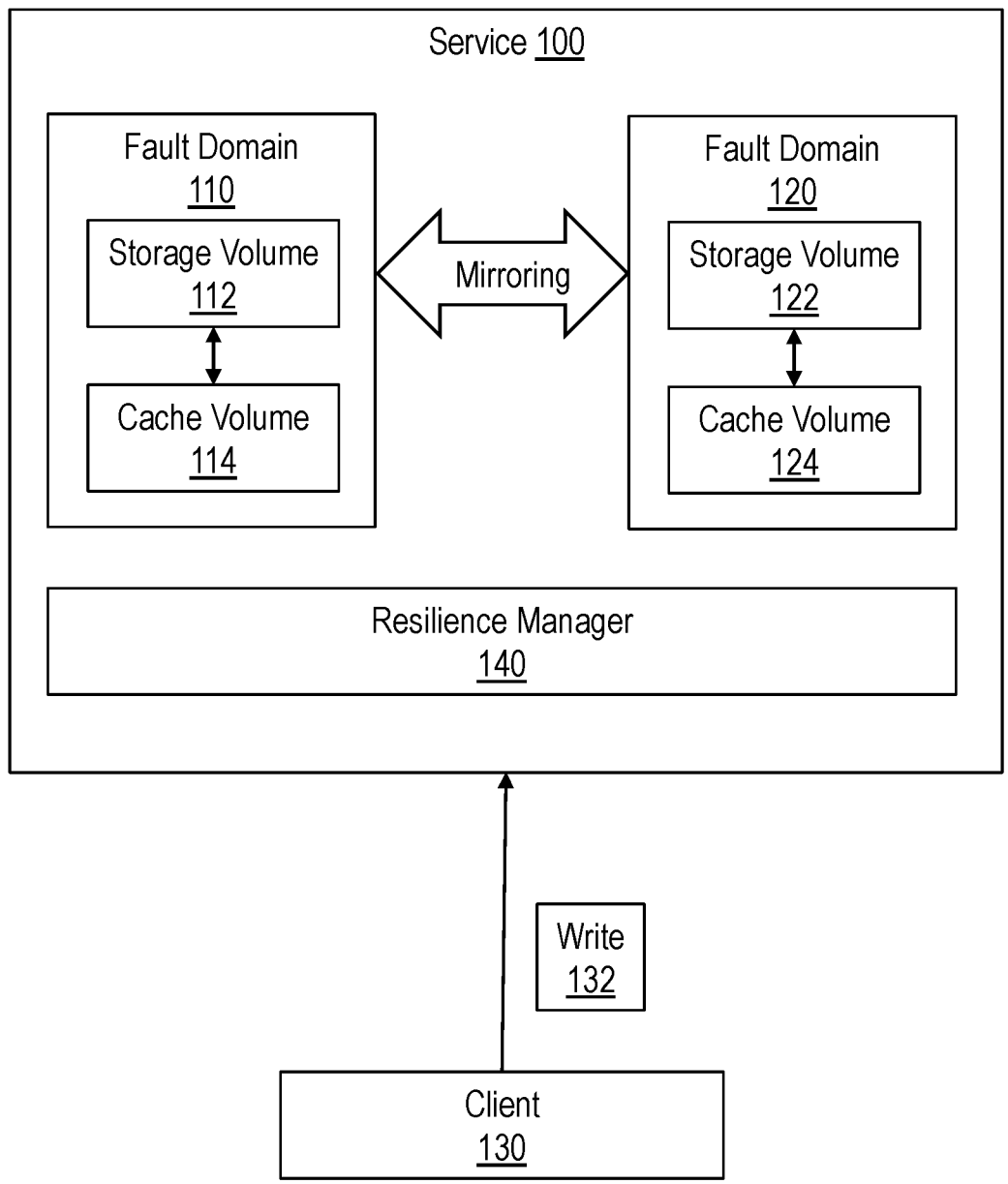
FIG. 1 illustrates an example computer system that embodies the principles described herein.

The current invention solves the above problem by dynamically maintaining storage resiliency using one or more thinly provisioned cache volumes at a computer system. As a result, the invention provides a technical effect of increased data availability and increased resilience of data service without requiring additional resources, i.e., providing a more efficient way of improving data availability and resilience. FIG. 1 illustrates an example of a computer system 100 that embodies the principles described herein. In embodiments, the computer system 100 (e.g., a service computer system) is configured to provision a plurality of storage volumes at a plurality of fault domains. The computer system 100 is also configured to thinly provision a plurality of cache volumes at the plurality of fault domains. In some embodiments, each of the plurality of fault domains is one or more computing nodes configured to communicate with the computer system over a network.

In embodiments, each cache volume is thinly provisioned, while each storage volume may be thinly or thickly provisioned. Thick provisioning is a type of storage allocation, in which an amount of underlying storage resources equaling a storage volume's capacity are allocated to that storage volume. Thin provisioning is another type of storage provisioning that uses virtualization technology to give the appearance of having more physical resources than are actually available. Thin provisioning enables creating and presenting a logical volume with more capacity than is physically allocated to it on the storage array. A thinly provisioned logical volume does not require physical storage to be completely allocated to it at the time it is created and presented to a host. Physical storage is allocated to the host "on-demand" from a shared pool of physical capacity.

In some cases, one of the fault domains may be unavailable, causing a cache volume and/or a storage volume to be unavailable. In response to determining that at least one fault domain in the plurality of fault domains is unavailable, the computer system 100 is configured to allocate an extra portion of storage in a cache volume at an available fault domain; and cache an extra copy of the data associated with the write operation in the extra portion of storage in the cache volume. In response to determining that the at least one fault domain (that was previously unavailable) becomes available, the extra copy of cached data is persistently stored in a storage volume at the at least one fault domain that was previously unavailable and currently available. After that, the extra portion of storage in the cache volume is deallocated. As such, additional cache storage is only temporarily allocated at available fault domains when some other fault domains are unavailable, providing a technical effect of reducing the footprint of the cache during healthy operation.

For example, as illustrated in FIG. 1, the computer system 100 is a service computer system that has provisioned a first storage volume 112 and a first cache volume 114 at a first fault domain 110, and a second storage volume 122 and a cache volume 124 at a second fault domain. The first storage volume 112 and the second storage volume are configured to mirror each other. For example, when a client computer system 130 generates a write request 132, requesting a write operation to be performed, the write operation will be persistently performed at both the first storage volume 112 and the second storage volume 122.

When the first fault domain 110 is unavailable, the computer system 100 is configured to allocate an extra portion of storage in the second cache volume 124 at the second fault domain 120, and cache an extra copy of the data associated with the write operation in the extra portion of storage in the second cache volume 124. When the first fault domain 110 becomes available again, the extra copy of the cached data in the second cache volume 124 is persistently stored in the first storage volume 112 at the first fault domain 110. After that, the extra portion of storage in the second cache volume 124 is deallocated or demapped. Whilst the example shown in FIG. 1 shows only two fault domains, it will be appreciated that there may be more than two fault domains, and the write operation may be persistently performed at any two or more fault domains.

Generally, a file system maintains a pointer map to the directories, subdirectories, and files that are part of the file system. Files are created and managed by users and/or applications and reside in the file system. The file system is mapped to file system blocks, and the file system blocks are mapped to logical extents of a logical volume, which are in turn mapped to disk physical extents either by the operating system or by a logical volume manager. These physical extents are, in turn, mapped to disc sectors in a storage subsystem. When the portion of the particular logical volume is deallocated, the portion of the storage is demapped from the file system.

Since the cache volumes 114, 124 are thinly provisioned, additional cache storage is only temporarily allocated at an available cache volume when a fault domain is unavailable, providing a technical effect of increased resiliency without permanently increasing usage of hardware resources.

In some embodiments, the computer system 100 also includes a resilience manager 140 configured to manage one or more resilience policies of storage service. In some embodiments, the resilience manager 140 is further configured to receive a user input at the client computer system 130 to configure the one or more resilience policies. In some embodiments, the computer system 100 is configured to provide a storage service to a plurality of entities, and each of the plurality of entities has a separate resilience policy configured therefor.

In some embodiments, the user input indicates that N copies of data are to be maintained for the storage service, where N is a natural number that is greater than 1. In response to receiving the user input, indicating that N copies of data are to be maintained, the computer system 100 is configured to thickly or thinly provision N storage volumes, each of which resides at one of N different fault domains. The computer system 100 is further configured to thinly provision N cache volumes, each of which resides at one of the N different fault domains. In some embodiments, in response to determining that at least one of the N different fault domains is unavailable, the computer system 100 is configured to cache an extra copy of data associated with the write operation in a cache volume that resides at an available fault domain from the N fault domains. For example, when N=2, a first storage volume 112 and a first cache volume 114 are provisioned at a first fault domain 110, and a second storage volume 112 and a second cache volume 124 are provisioned at a second fault domain 120.

In some embodiments, the user input further indicates that M copies of data are to be written during a write operation, where M is a natural number that is greater than 1. M may be less, equal to, or greater than N. In some embodiments, M<N; as such, as long as no more than N-M fault domains are simultaneously unavailable, no extra copy of data is cached. For example, if N=3, and M=2, if one of three fault domains is unavailable, no extra copy of data is cached. However, if two of three fault domains are unavailable, an extra copy of data is cached in the cache volume at the available fault domain.

In some embodiments, the system has a resiliency R, and M is a threshold of healthy copies below which write operations are redirected to other available domains to achieve the resiliency R. In embodiments, one or more extra copies are cached at cache volumes only if fewer than M copies can be written to storage volumes. As such, if between N and M copies are successfully written to storage volumes, no extra cache is required. If M-1 or fewer write operations succeed, the write operation is redirected to the cache, and R copies are written.

For example, when N=3, R=4, M=2, the system would yield a three way mirror during a healthy write operation, and the system will redirect the write operation to a cache volume at a healthy fault domain to achieve the resiliency R (=4) if a number of healthy copies falls below M (=2). For example, if a number of healthy copies is 1, three additional copies of data associated with the write operation is cached at one or more cache volumes to achieve the resiliency 4. However, if a number of healthy copies is 2, no additional copy of data is cached.

Generally, if M=N, whenever any fault domain is unavailable, an additional copy of data will be cached in one of the cache volumes at an available fault domain. If M≠N, the computer system 100 is first configured to determine that less than M fault domains are available. In response to determining that less than M fault domains are available, the computer system 100 is configured to cache one or more extra copies of data associated with the write operation in one or more cache volumes that resides in one or more available fault domains, such that at least M copies are made.

In some embodiments, the cache volumes 114, 124 are provisioned over a first type of storage, and the storage volumes 112, 122 are provisioned over a second type of storage. In some embodiments, the first type of storage is tier-one storage that has a first access speed, and the second type of storage is tier-two storage that has a second access speed that is slower than the first access speed. For example, in some embodiments, the cache volumes 114, 124 are provisioned over an ultra disk or a higher speed solid state disk (SSD), and the storage volumes 112, 122 are provisioned over a lower speed SSD or a hard disk drive (HDD).

The same principles described above are also applicable to virtual machines. In some embodiments, rather than provisioning actual hardware for an account associated with the entity, the computer system 100 implements a hypervisor between the physical computer system hardware and the operating system environments. The hypervisor is configured to create an environment for each virtual machine. Each virtual machine contains its own virtual CPU, memory, storage disk, network interface card, etc. For example, in some embodiments, the computer system 100 is configured to create a virtual machine that meets the requirements of each entity. The computer system 100 can then use load balancing and high availability to ensure that the service meets the required access needs. As the entity's needs grow, the virtual machine's storage space and processing power can be scaled to meet the new requirements.

Figure 2:
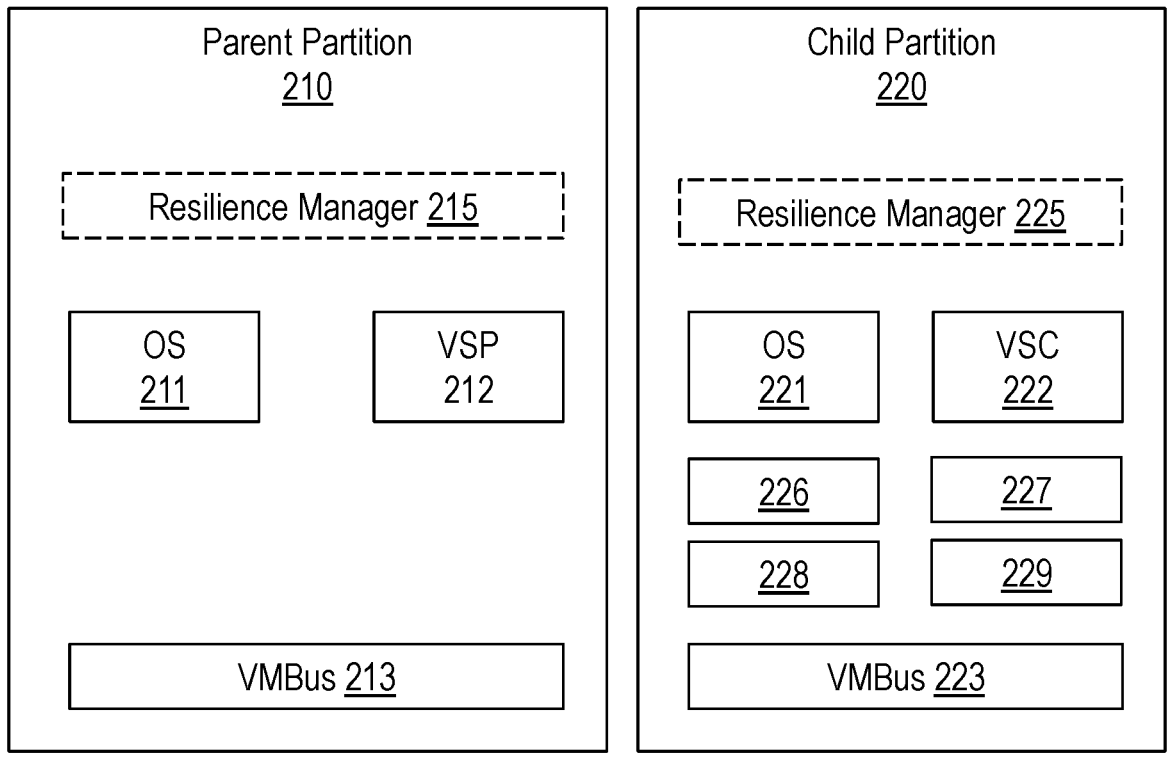
FIG. 2 illustrates an example architecture of a computer system that has a hypervisor implemented thereon.
Figure 2:
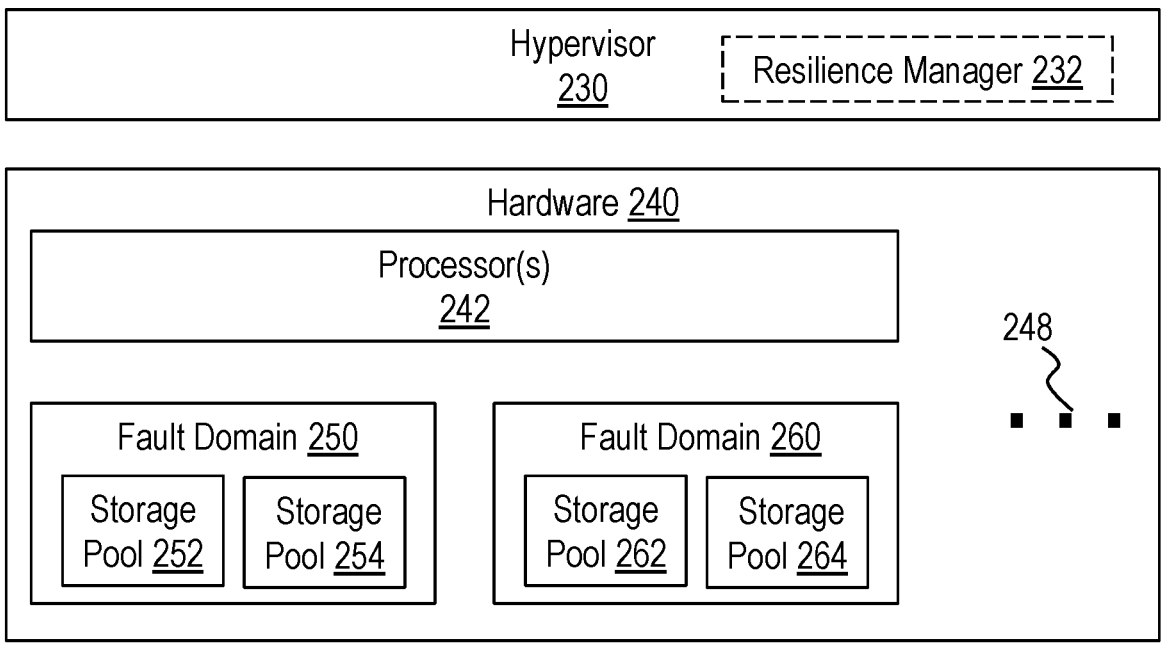

FIG. 2 illustrates an example architecture of a computer system 200 (which may correspond to the computer system 100) that has a hypervisor 230 implemented thereon. The hypervisor 230 sits between physical hardware 240 and operating system environments. As illustrated in FIG. 2, the physical hardware 240 of the computer system 200 includes one or more processors 242 and a plurality of storage pools 252, 254, 262, 264 residing at different fault domains 250, 260. As illustrated, storage pools 252, 254 reside at fault domain 250, and storage pools 262, 264 reside at fault domain 260. The ellipsis 248 represents that there may be additional hardware devices and/or additional storage pools in the computer system 200. In some embodiments, different storage pools contain different types of storage devices. For example, in some embodiments, storage pools 252, 262 contain a first type of storage devices, and storage pools 254, 264 contain a second type of storage devices. In some embodiments, the different types of storage devices are classified into different tiers based on their performance and/or access speed. For example, in some embodiments, the first type of storage device is tier-one storage that has a first access speed, and the second type of storage device is tier-two storage that has a second access speed.

As shown in FIG. 2, the operating system environments of the computer system 200 include a plurality of partitions, such as a parent partition 210 and one or more child partition(s) 220. The parent partition 210 is configured to run a parent operating system 211. The parent partition 210 is also configured to run a virtualization service provider VSP 212. The VSP 212 has direct access to the physical hardware 240. In some embodiments, the parent partition 210 is configured to create child partition(s) 220, each of which hosts a child guest operating system 221. In some embodiments, the parent partition 210 creates a child partition 220 using a hypercall application programming interface (API), which is an API exposed by the hypervisor 230.

The VSP 212 at the parent partition 210 is configured to connect VMBus 213 of the parent partition 210 and VMBus 223 of the child partition 220 to handle device access requests from the child partition 220. The child partition 220 internally runs a virtualization service client (VSC) 222. The VSC 222 is configured to redirect the request from the child partition 220 to the VSP 212 in the parent partition 210 via the VMBus 213, 223.

Notably, the child partition 220 does not have direct access to the physical processors, nor does it handle its real interrupts. Instead, it has a virtual view of the processor(s) 242 and runs in Guest Virtual Address, which, depending on the configuration of the hypervisor 230, might not necessarily be the entire virtual address space. Depending on the configuration of the computer system 200, the hypervisor 230 may expose only a subset of the processors 242 to each partition. The hypervisor 230 handles the interrupts to the processors 242, and redirects them to the respective partition 220 using a logical controller.

Additionally, the child partition 220 also does not have direct access to hardware resources, such as storage disks in storage pools 262, 264. Instead, the child partition 220 has a virtual view of the resources, in terms of virtual devices. Any request to the virtual devices is redirected via the VMBus 213, 223 to the devices in the parent partition 210. The VMBus 213, 223 is a logical channel that enables inter-partition communication. The response from the parent partition 210 to the child partition 220 is also redirected via the VMBus 213, 223.

Here, in a virtual environment, storage provisioning is a process of assigning storage resources to VMs based on the capacity, availability, and performance requirements of applications running on the VMs. For example, when the child partition 220 is created, a type of virtual disk and an amount of disk space are provisioned for the child partition 220. As illustrated in FIG. 2, the child partition 220 has access to logical volumes 226-229 provisioned over storage in storage pools 252, 254, 262, 264. For example, logical volume 226 (also referred to as a first cache volume) is thinly provisioned over storage devices in storage pool 252 (at fault domain 250) for temporarily caching data. The logical volume 227 (also referred to as a first cache volume) is provisioned over storage devices in storage pool 254 for persistently storing data. Logical volume 228 (also referred to as a second cache volume) is thinly provisioned over storage devices in storage pool 262 (at fault domain 260) for temporarily caching data. The logical volume 229 (also referred to as a second storage volume) is provisioned over storage device in storage pool 264. Note, each cache volume is thinly provisioned, while each storage volume may be thinly or thickly provisioned.

Similar to the computer system 100, the computer system 200 also implements a resilience manager 225 configured to implement a resilience policy. A user and/or an application running at the child partition 220 is able to configure the resilience policy. In some embodiments, a resilience manager 225 is implemented at each child partition 220 configured to allow a user of each child partition to configure a resilience policy associated with the corresponding child partition 220. In some embodiments, the resilience manager 215, 232 is implemented at the parent partition 210 and/or the hypervisor 230 configured to manage the resilience of multiple partitions.

Similar to the computer system 100 of FIG. 1, when the computer system 200 determines that a particular fault domain is unavailable, an extra copy of data is cached in a cache volume at an available fault domain. For example, when the fault domain 250 is unavailable, the cache volume 226 and the storage volume 227 will all become unavailable. In such a case, an extra copy of data is cached in the cache volume 228 (provisioned over devices at fault domain 260). When the fault domain 250 becomes available again later, the cache volume 226 and the storage volume 227 will also become available, and the extra copy of data is copied to the cache volume 226 and eventually persistently stored in the storage volume 227. After that, the portion of storage used to cache the extra copy of data in the cache volume 228 can be deallocated or demapped. Whilst the example shown in FIG. 2 comprises only two fault domains 250, 260, and one child partition 220, it will be appreciated that there may be more than two fault domains and the write operation may be persistently performed at any two or more fault domains. Similarly, whilst the example shown in FIG. 2 comprises only one child partition, there may be more than one child partition in the system 200.

In some embodiments, the computer system 100 and/or the computer system 200 are configured to provide a storage service to entities. In some embodiments, the computer system 100 and/or the computer system 200 are database servers configured to manage access to one or more databases, such as SQL (structured query language) databases. In databases, data are often stored in a highly structured manner, such as tables; and a write operation is performed on a portion of the structured data, such a particular cell of a particular table. Further, some storage disks, such as flash drives, solid state drives (SSDS) are logically organized in blocks and pages. A page is the smallest object that can be read or written. Different storage may have different page sizes, such as (but not limited to) 4 KDB, 8 KB, and 16 KB.

Figure 3A:
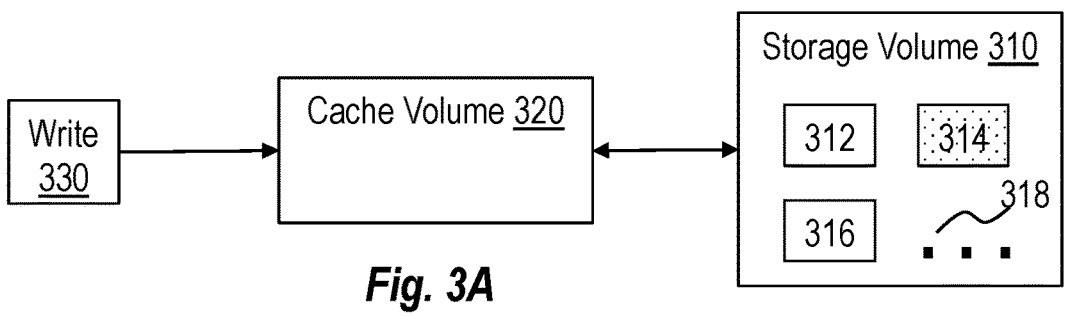
FIGS. 3A-3E illustrate an example process of performing a write operation over a portion of data stored in a storage volume.
Figure 3B:
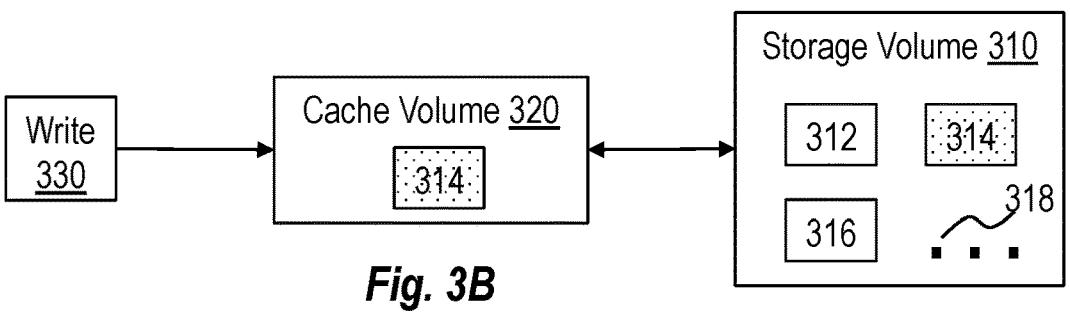
Figure 3C:
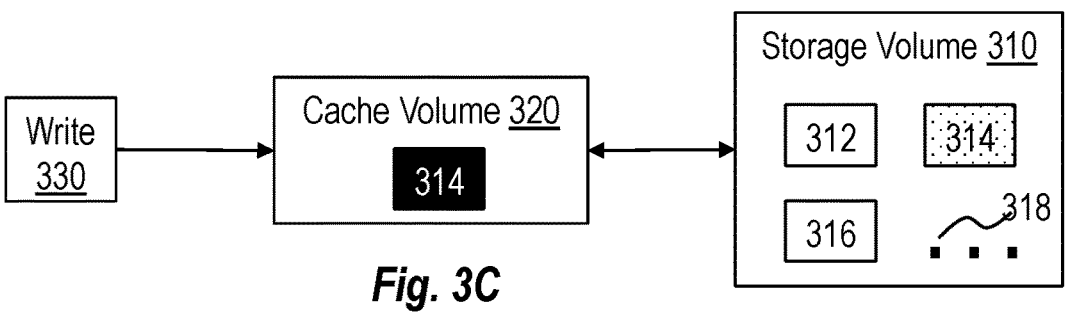
Figure 3D:
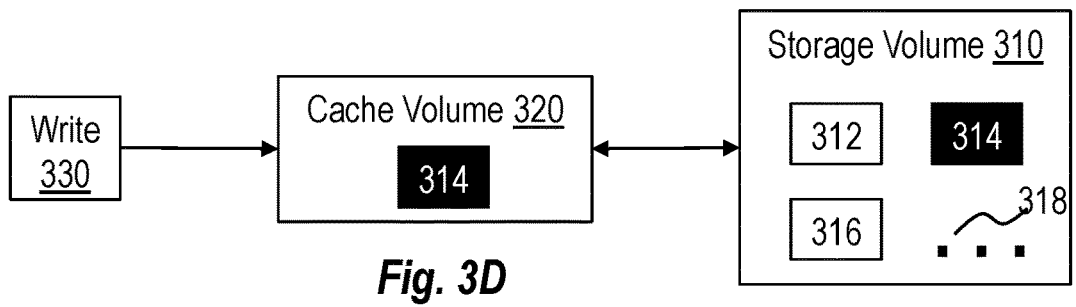
Figure 3E:
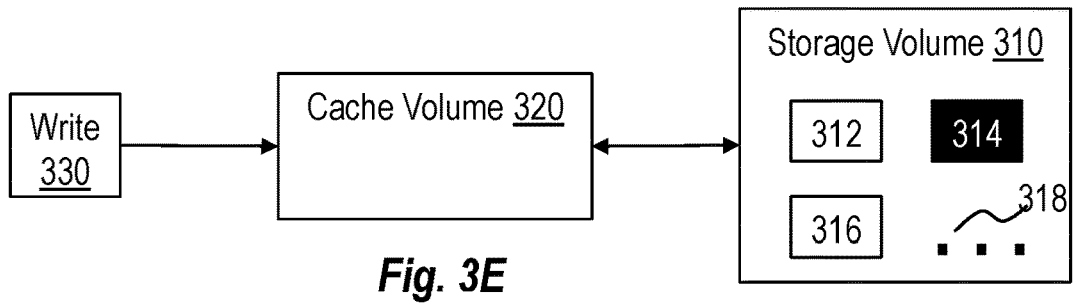

FIGS. 3A-3E illustrate an example process of performing a write operation over a portion of data stored in a storage volume 310. As illustrated in FIGS. 3A-3D, the storage volume 310 is logically organized in portions 312, 314, 316. Ellipsis 318 represents that there may be any number of portions in the storage volume 310. Each portion can be (but are not limited to) a page, a block, a cell of a table, a record of a database, etc. The ellipsis 318 represents that there may be any number of portions in the storage volume 310. Referring to FIG. 3A, when a write request 330 (requesting for performing a write operation) is received, a particular portion associated with the write request 330 in the storage volume 310 is identified. Assuming that the particular portion, in this case, is portion 314, as illustrated in FIG. 3B, the particular portion (e.g., portion 314) is retrieved and cached in a cache volume 320. As illustrated in FIGS. 3C-3D, the write operation is first performed on the cached portion 314, and the cached portion 314 with the write operation performed thereon is then persistently stored at the storage volume 310. After the portion 314 with the write operation performed thereon is persistently stored in the storage volume 310, as illustrated in FIG. 3D, the cached portion 314 will eventually be deallocated.

In embodiments, the cache volume is thinly provisioned. Thus, the actual storage space allocated for the cache volume 320 is based on the amount of data cashed in the cache volume 320. Once the cached portion 314 is deallocated, the cache volume 320 will no longer use that portion.

Further, as discussed above with respect to FIGS. 1 and 2, there are multiple cache volumes and storage volumes provisioned at different fault domains for mirroring data. For each cache volume and storage volume, the above-described process will occur when a write request is received. For example, when two cache volumes and two storage volumes are provisioned over two fault domains, the above-described process will repeat twice (assuming both fault domains are available).

However, with disaggregated storage, some fault domains may become temporarily unavailable at some time. When at least one of multiple fault domains is unavailable, data resiliency degrades. To mitigate such degradation of data resiliency, the principles described herein allow additional copies of data to be cached at cache volumes at the available fault domains.

Figure 4A:
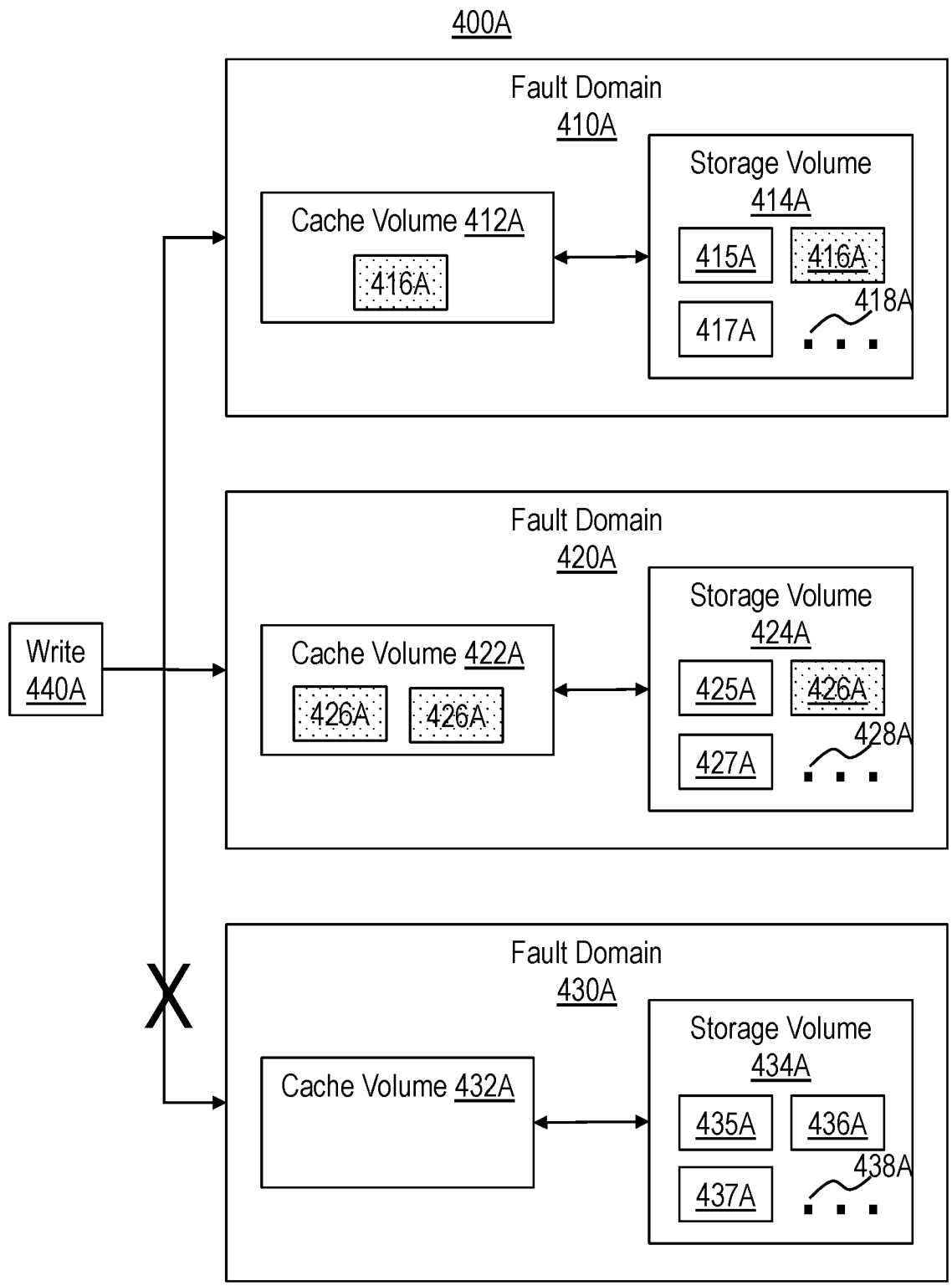
FIG. 4A illustrates an example embodiment, in which when one of three fault domains is unavailable, an extra copy of data is cached at an available cache volume.

FIG. 4A illustrates an example embodiment 400A, in which when one of three fault domains is unavailable, an extra copy of data is cached at an available cache volume. As illustrate in FIG. 4A, a first cache volume 412A and a first storage volume 414A are provisioned over storage at a first fault domain 410A; a second cache volume 422A and a second storage volume 424A are provisioned over storage at a second fault domain 420A, and a third cache volume 432A and a third storage volume 434A are provisioned over storage at a third fault domain 430A. Each of the first storage volume 414A, the second storage volume 424A, and third storage volume 434A is logically organized in portions; and they mirror each other. For example, the portions 415A, 416A, 417A in the first storage volume 414A mirrors the portions 425A, 426A, 427A in the second storage volume 424A respectively, and also mirrors the portions 435A, 436A, 437A in the third storage volume 434A respectively. The ellipsis 418A, 428A, 438A represent that there may be any number of portions in each of the first storage volume 414A, second storage volume 424A, and third storage volume 434A.

When all three fault domains are available, in response to receiving a write request 440A (requesting for performing a write operation on data), each of the first cache volume 412A, second cache volume 422A, and third cache volume 432A is configured to retrieve a particular portion (e.g., portion 416A, 426A, 436A) associated with the write operation in its corresponding storage volume, cache the portion in itself, and perform the write operation on the cached portion. After that, each cached portion with the write operation performed thereon is then persistently stored in the corresponding storage volume.

However, the three fault domains may not be all available at all times. In some embodiments, when one of the three fault domains is unavailable, an available fault domain is selected to cache an extra copy of data (e.g., a portion) associated with the write operation. As illustrated in FIG. 4A, assuming in response to receiving the write request 440A, it is determined that the third fault domain 430A is unavailable. In such a case, one of the first fault domain 410A or the second fault domain 420A is selected to cache an extra copy of the portion associated with the write operation. In some embodiments, the selection is random and/or based on one or more storage policies. For example, a cache volume that has more free space may be selected. Alternatively, or in addition, when both cache volumes have a same amount of free space, one of the cache volumes is randomly selected, or alternately selected.

As illustrated in FIG. 4A, the second fault domain 420A is selected in this case to cache an extra copy of portion 426A in the second cache volume 422A. After the third fault domain 430A becomes available later, the extra copy of portion 426A is copied to the third cache volume 432A and/or persistently stored in the portion 436A of the third storage volume 434A. After that, the extra copy of portion 426A can be deallocated and demapped. Because the cache volume is thinly provisioned, storage in the cache volume is allocated on-demand. In this way, the footprint of the cache during the healthy running of the system is reduced.

In some embodiments, a user can configure a resilience policy. For example, the user may configure that N copies of data are to be maintained for the resilience, where N is a natural number that is greater than 1. As another example, the user may further configure that M copies of data are to be written during a write operation, where M is a natural number that is greater than 1. M may be greater, equal to, or less than N. When M is greater than N, at least one cache volume is always configured to cache an extra copy of data.

Figure 4B:
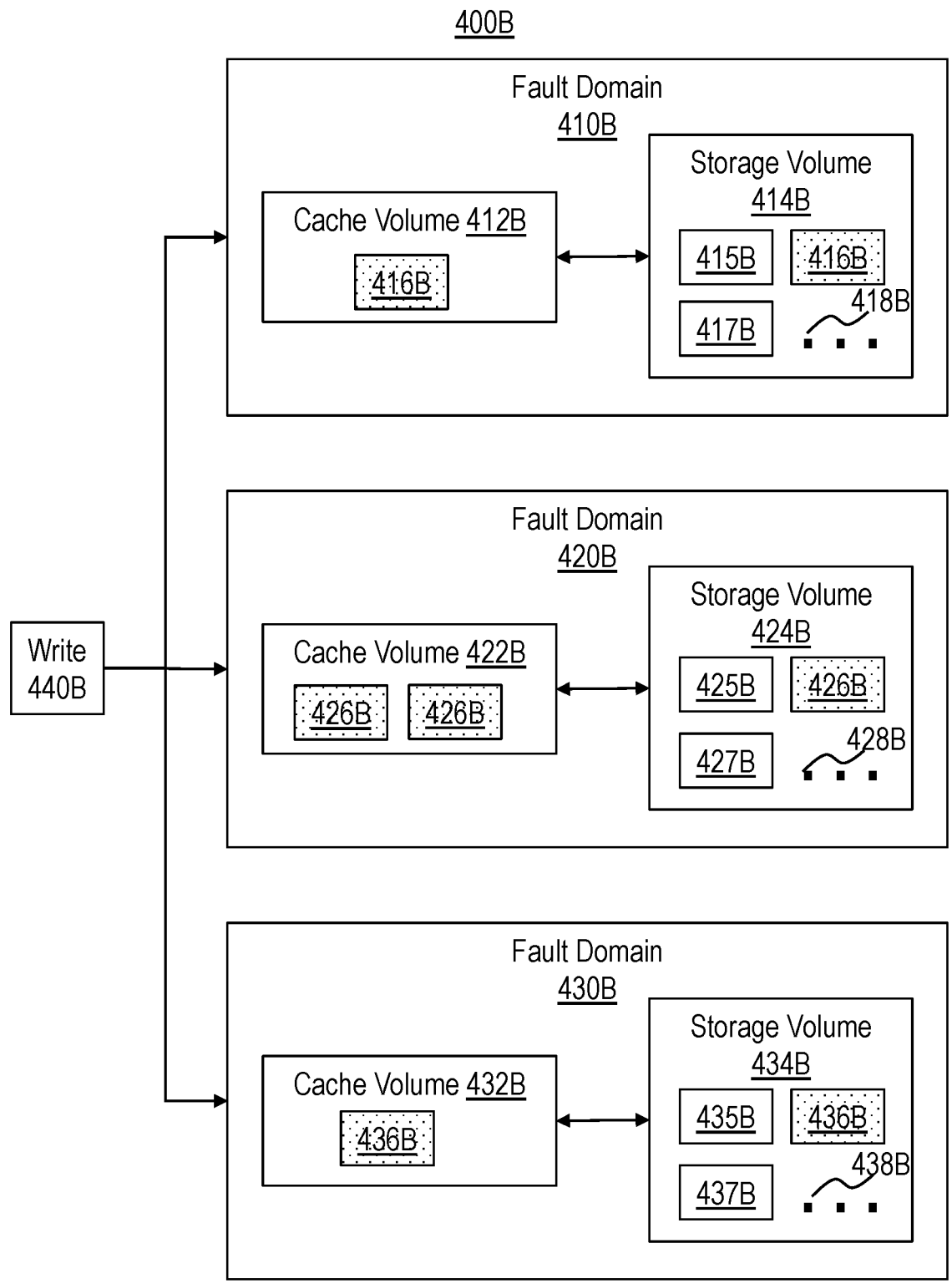
FIG. 4B illustrates an example embodiments, in which four copies of data are required to be cached at three cache volumes.

FIG. 4B illustrates another example embodiment 400B, in which four copies of data are cached at three cache volumes. Similar to the scenario shown in FIG. 4A, in FIG. 4B, a first cache volume 412B and a first storage volume 414B are provisioned over storage at a first fault domain 410B; a second cache volume 422B and a second storage volume 424B are provisioned over storage at a second fault domain 420B, and a third cache volume 432B and a third storage volume 434B are provisioned over storage at a third fault domain 430B. Each of the first storage volume 414B, the second storage volume 424B, and third storage volume 434B is logically organized in portions; and they mirror each other. For example, the portions 415B, 416B, 417B in the first storage volume 414B mirrors the portions 425B, 426B, 427B in the second storage volume 424B respectively, and also mirrors the portions 435B, 436B, 437B in the third storage volume 434B respectively. The ellipsis 418B, 428B, 438B represent that there may be any number of portions in each of the first storage volume 414B, second storage volume 424B, and third storage volume 434B.

Unlike the scenario shown in FIG. 4A, in FIG. 4B, in response to receiving a write request 440B, even when the first fault domain 410B, second fault domain 420B, third fault domain 430B are all available, an extra copy of data is still cached at one of the cache volumes, which provides extra resiliency during write operations. For example, one of the available fault domains may be available at the beginning of the write operation, and later become unavailable during the write operation. Having additional copies of cached data would mitigate such a situation.

In some embodiments, the cache volume that caches the extra copy of data is selected based on storage policy rules. In some embodiments, the cache volume that caches the extra copy of data is selected randomly or alternately (e.g., round-robin). Such that storage devices in different fault domains are utilized evenly, providing a technical effect of prolonging the overall live expectancy of multiple storage devices. In some embodiments, each of the cache volumes is configured to cache an extra copy of data, providing a technical effect of doubling the cache resiliency. As illustrated in FIG. 4B, an extra copy of portion 426B is cached in the second cache volume 422B at the second fault domain 420B. Whilst the example shown in FIGS. 4A and 4B comprise three fault domains, it will be appreciated that there may be any number of fault domains, and the write operation may be persistently performed at any number of fault domains.

In some embodiments, in response to receiving a write request, the computer system 100 or 200 is configured to determine whether M fault domains are available. When fewer than M fault domains are available, the computer system 100 or 200 is configured to select one or more cache volumes at the available fault domains to cache additional copies of data, such that M copies of cache are made during the write operation. Note, in some cases fewer than M fault domains being available may be caused by that certain fault domains are unavailable. In some cases, this could be caused by a resilience policy that indicates M>N. In such a case, even when all N fault domains are available, additional copies of data are still required to be cached.

Note, FIGS. 1-2, 3A-3D, and 4A-4B illustrate that in each fault domain, a cache-storage volumes pair is provisioned. However, such embodiments are not required. For example, in some embodiments, a fault domain may include more than one cache-storage volumes pair. In some embodiments, in a cache-storage volumes pair, the cache volume and the storage volume reside at separate fault domains. Similar principles as described above are also applicable to these alternative embodiments.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
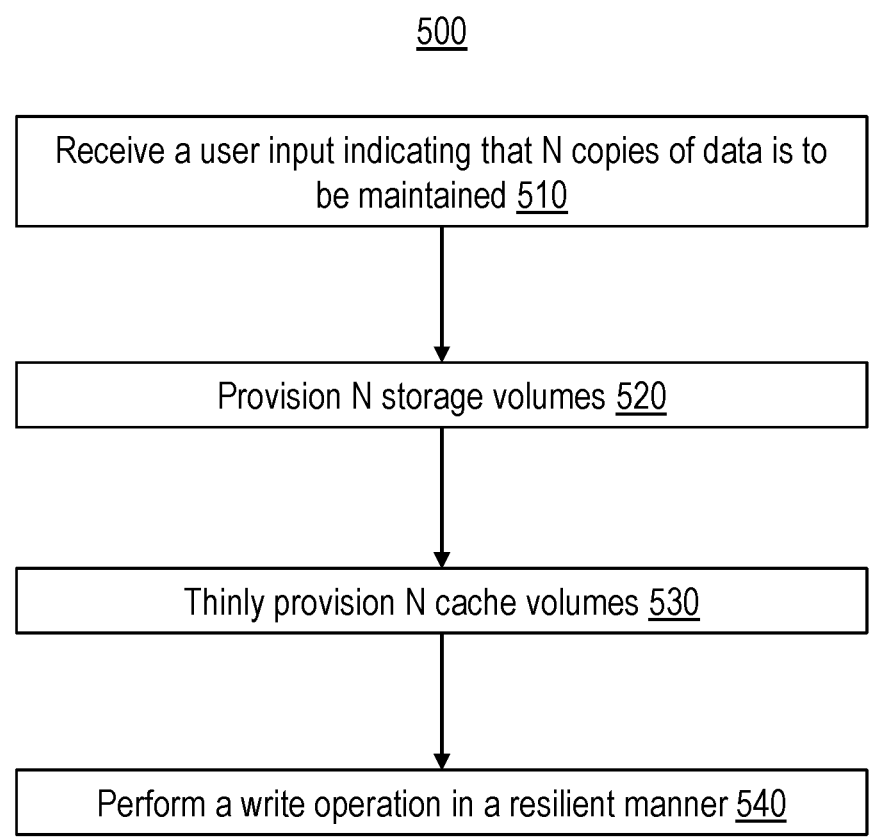
FIG. 5 illustrates a flowchart of an example method for dynamically maintaining storage resiliency using one or more thinly provisioned cache volumes.

FIG. 5 illustrates a flowchart of an example method 500 implemented at a computer system for dynamically maintaining storage resiliency using one or more thinly provisioned cache volumes. The method 500 includes receiving a user input indicating that N copies of data are to be maintained (act 510). The method 500 further includes provisioning N volumes at N fault domains (act 520), and thinly provisioning N cache volumes at the N fault domains (act 530), where N is a natural number that is greater than 1. The method 500 also includes performing a write operation in a resilient manner (act 540).

Figure 6:
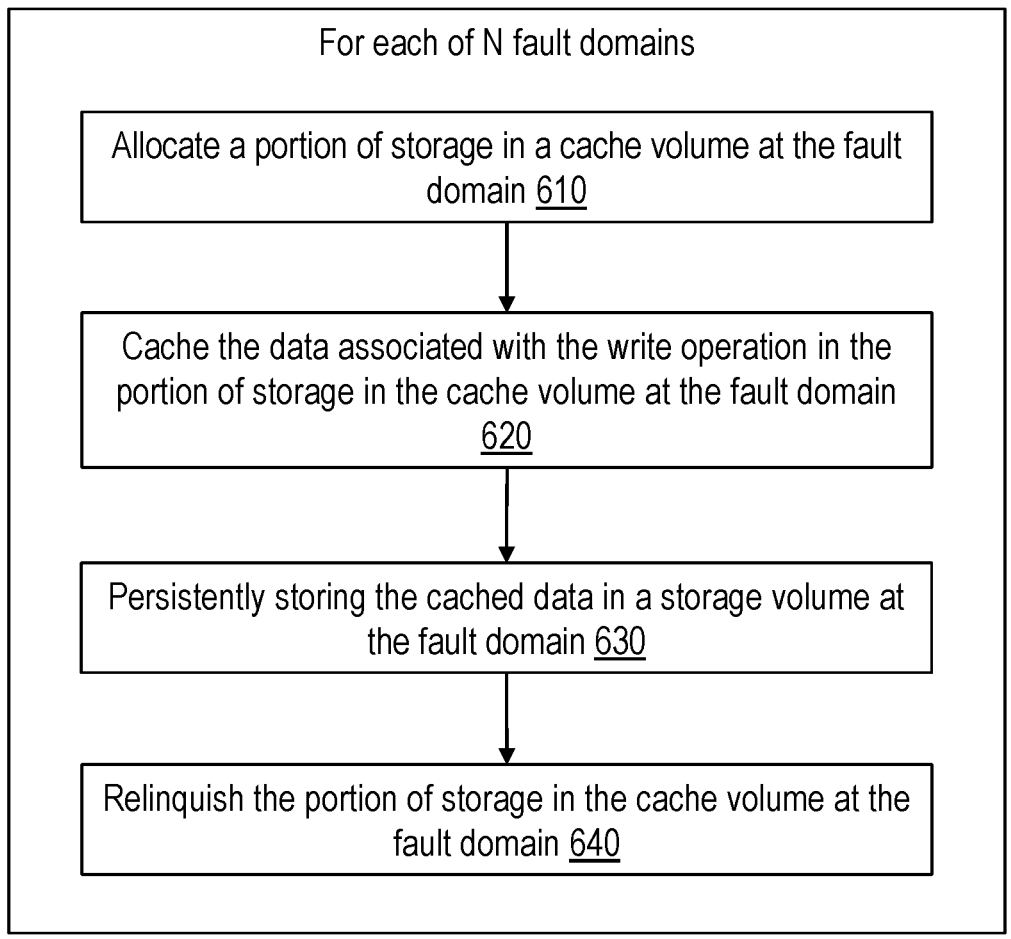
FIG. 6 illustrates a flowchart of an example method for performing a write operation in a resilient manner.

FIG. 6 illustrates a flowchart of an example method 600 for performing a write operation in a resilient manner (which corresponds to act 540 of FIG. 5). The method 600 includes for each of N fault domains, allocating a portion of storage in a cache volume at the fault domain (act 610), and caching the data associated with the write operation in the portion of storage in the cache volume at the fault domain (act 620). The method 600 also includes persistently storing the cached data in a storage volume at the fault domain (act 630). After that, the portion of storage in the cache volume at the fault domain is deallocated (act 640).

Figure 7:
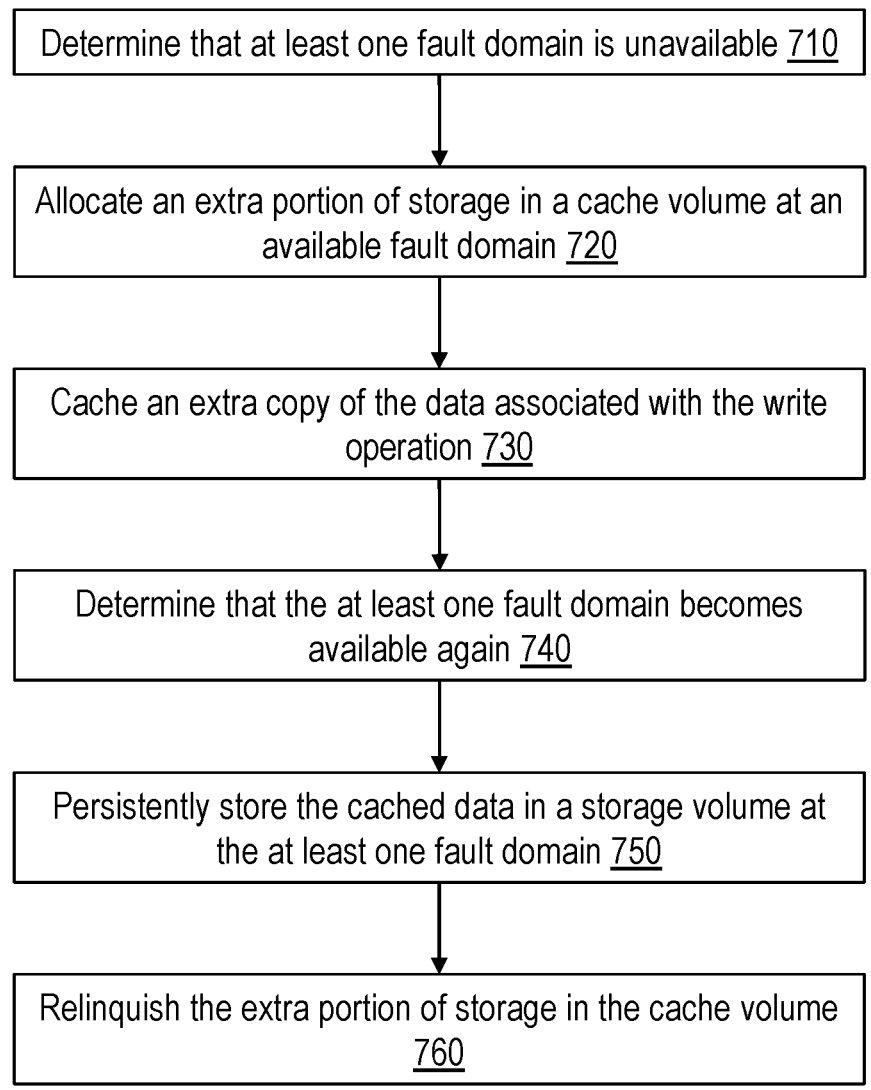
FIG. 7 illustrates a flowchart of an example method for increasing cache resilience when at least one fault domain in a plurality of fault domains is unavailable.

FIG. 7 illustrates a flowchart of an example method 700 for increasing cache resilience when at least one fault domain in a plurality of fault domains is unavailable. The method 700 includes determining that at least one fault domain in the plurality of fault domains is unavailable (act 710). In response to determining that the at least one fault domain is unavailable, an extra portion of storage in a cache volume at an available fault domain is allocated (act 720), and an extra copy of the data associated with the write operation is cached in the extra portion of storage in the particular cache volume (act 730). The method 700 further includes determining that the at least one fault domain becomes available again (act 740). In response to determining that the at least one fault domain becomes available again, the data cached in the portion of storage of the cache volume is persistently stored (act 750). After that, the extra portion of storage in the cache volume is deallocated (act 760).

Figure 8:
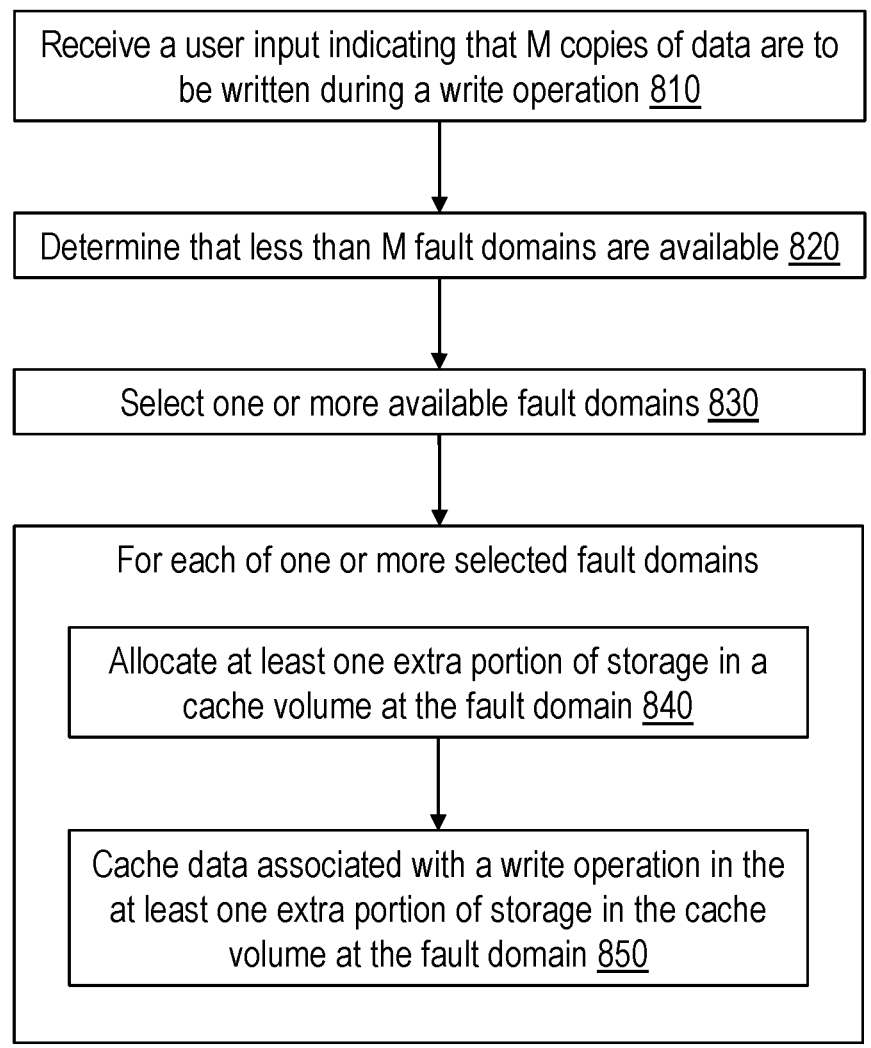
FIG. 8 illustrates a flowchart of an example method for increasing cache resilience regardless of whether any fault domain is unavailable.

FIG. 8 illustrates a flowchart of another example method 800 for increasing cache resilience regardless of whether any fault domain is unavailable. The method 800 includes receiving a user input indicating that M copies of data are to be written during a write operation (act 810), where M is a natural number that is greater than 1. M may be greater, equal, or fewer than N. The method 800 further includes determining that less than M fault domains are available (act 820). In response to determining that less than M fault domains are available, one or more available fault domains are selected (act 830). For each of the one or more selected domains, at least one extra portion of storage in a cache volume is allocated at the fault domain (act 840), and data associated with a write operation is cached at the at least one extra portion of storage in the cache volume at the fault domain (act 850).

Finally, because the principles described herein may be performed in the context of a computer system some introductory discussion of a computer system will be described with respect to FIG. 9.

Computer systems are now increasingly taking a wide variety of forms. Computer systems may, for example, be hand-held devices, appliances, laptop computer systems, desktop computer systems, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer system-executable instructions that may be executed by a processor. The memory may take any form and may depend on the nature and form of the computer system. A computer system may be distributed over a network environment and may include multiple constituent computer systems.

Figure 9:
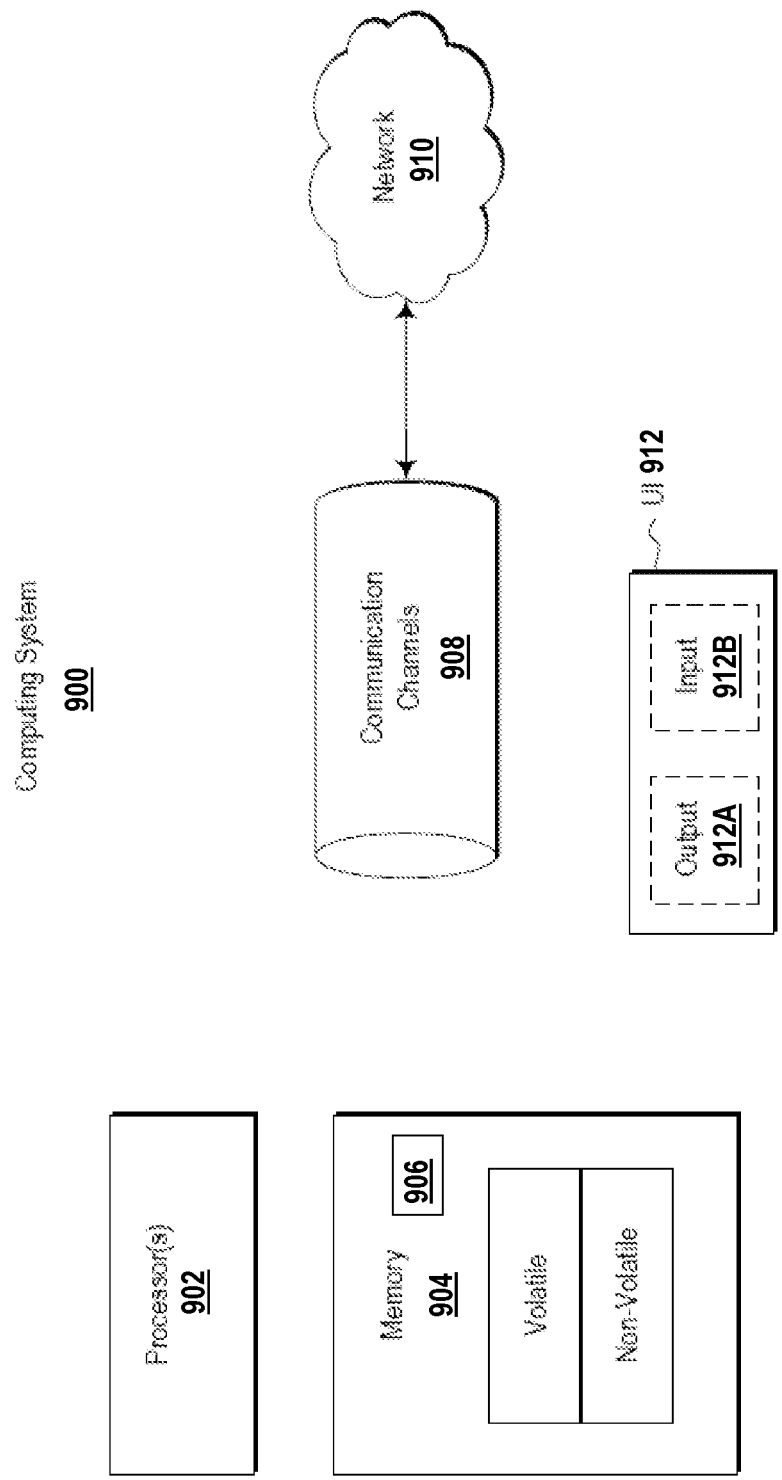
FIG. 9 illustrates an example computer system in which the principles described herein may be employed.

As illustrated in FIG. 9, in its most basic configuration, a computer system 900 typically includes at least one hardware processing unit 902 and memory 904. The processing unit 902 may include a general-purpose processor and may also include a field-programmable gate array (FPGA), an application-specific integrated circuit (ASIC), or any other specialized circuit. The memory 904 may be physical system memory, which may be volatile, non-volatile, or some combination of the two. The term "memory" may also be used herein to refer to non-volatile mass storage such as physical storage media. If the computer system is distributed, the processing, memory and/or storage capability may be distributed as well.

The computer system 900 also has thereon multiple structures often referred to as an "executable component". For instance, memory 904 of the computer system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer system-readable storage media.

In such a case, one of ordinary skill in the art will recognize that the structure of the executable component exists on a computer system-readable medium such that, when interpreted by one or more processors of a computer system (e.g., by a processor thread), the computer system is caused to perform a function. Such a structure may be computer system-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer system-executable instructions that constitute an executable component. For example, such computer system-executable instructions may be embodied in one or more computer system-readable media that form a computer system program product. An example of such an operation involves the manipulation of data. If such acts are implemented exclusively or near-exclusively in hardware, such as within an FPGA or an ASIC, the computer system-executable instructions may be hardcoded or hard-wired logic gates. The computer system-executable instructions (and the manipulated data) may be stored in the memory 904 of the computer system 900. Computer system 900 may also contain communication channels 908 that allow the computer system 900 to communicate with other computer systems over, for example, network 910.

While not all computer systems require a user interface, in some embodiments, the computer system 900 includes a user interface system 912 for use in interfacing with a user.

The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms, and so forth. Examples of input mechanisms 912B might include, for instance, microphones, touchscreens, holograms, cameras, keyboards, mouse or other pointer input, sensors of any type, and so forth.

Embodiments described herein may comprise or utilize a special purpose or general-purpose computer system, including computer system hardware, such as, for example, one or more processors and system memory, as discussed in greater detail above. Embodiments described herein also include physical and other computer system-readable media for carrying or storing computer system-executable instructions and/or data structures. Such computer system-readable media can be any available media that can be accessed by a general-purpose or special-purpose computer system. Computer system-readable media that store computer system-executable instructions are physical storage media. Computer system-readable media that carry computer system-executable instructions are transmission media. Thus, by way of example, and not limitation, embodiments of the invention can comprise at least two distinctly different kinds of computer system-readable media: storage media and transmission media.

Computer system-readable storage media includes RAM, ROM, EEPROM, CD-ROM, or other optical disk storage, magnetic disk storage, or other magnetic storage devices, or any other physical and tangible storage medium or hardware storage devices which can be used to store desired program code means in the form of computer system-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer system-executable instructions or data structures and which can be accessed by a general-purpose or special-purpose computer system. Combinations of the above should also be included within the scope of computer-readable media.

Further, upon reaching various computer system components, program code means in the form of computer system-executable instructions or data structures can be transferred automatically from transmission media to storage media (or vice versa). For example, computer system-executable instructions or data structures received over a network or data link can be buffered in RAM within a network interface module (e.g., a "NIC"), and then eventually transferred to computer system RAM and/or to less volatile storage media at a computer system. Thus, it should be understood that storage media can be included in computer system components that also (or even primarily) utilize transmission media.

Computer system-executable instructions comprise, for example, instructions and data which, when executed at a processor, cause a general-purpose computer system, special purpose computer system, or special purpose processing device to perform a certain function or group of functions. Alternatively or in addition, the computer system-executable instructions may configure the computer system to perform a certain function or group of functions. The computer system-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computer systems, desktop computer systems, laptop computer systems, message processors, hand-held devices, multi-processor systems, microprocessor-based or programmable consumer electronics, network PCs, minicomputer systems, mainframe computer systems, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

FIGS. 1-2, 3A-3E, and 4A-4B discussed various computer systems which correspond to the computer system 900 described herein. The computer systems of the remaining figures include various components or functional blocks that may implement the various embodiments disclosed herein, as will be explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of FIGS. 1-2, 3A-3E, and 4A-4B may include more or less than the components illustrated in FIG. 9, and some of the components may be combined as circumstances warrant. Although not necessarily illustrated, the various components of the computer systems may access and/or utilize a processor and memory, such as processing unit 902 and memory 904, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer system-readable hardware storage devices having stored thereon computer system-executable instructions that are structured such that when the computer system-executable instructions are executed by the one or more processors, the computer system is configured to:
   provision a plurality of storage volumes at a plurality of fault domains;
   thinly provision a plurality of cache volumes at the plurality of fault domains;
   perform a write operation in a resilient manner that maintains a plurality of copies of data associated with the write operation, performing the write operation in the resilient manner comprising, for each fault domain in the plurality of fault domains:
      allocating a portion of storage in a cache volume at a fault domain;
      caching the data associated with the write operation in the portion of storage in the cache volume at the fault domain;
      persistently storing the data that is cached in the cache volume in a storage volume at the fault domain; and
      after persistently storing the data, deallocating the portion of storage in the cache volume at the fault domain;
   in response to determining that at least one fault domain in the plurality of fault domains is unavailable,
      allocate an extra portion of storage in a cache volume at an available fault domain; and
      cache an extra copy of the data associated with the write operation in the extra portion of storage in the cache volume; and
   in response to determining that the at least one fault domain becomes available,
      persistently store the data cached in the extra portion of storage of the cache volume in a storage volume at the at least one fault domain; and
      deallocate the extra portion of storage in the cache volume.

2. The computer system of claim 1, wherein each of the plurality of fault domains is a different node configured to communicate with the computer system over a network.

3. The computer system of claim 1, wherein the computer system is further configured to receive a user input that configures a resilience policy.

4. The computer system of claim 3, wherein the user input indicates that N copies of data are to be persistently maintained, where N is a natural number that is greater than 1.

5. The computer system of claim 4, wherein in response to receiving the user input, indicating that N copies of data are to be maintained, the computer system is configured to:
provision N storage volumes, each of which resides at one of N different fault domains; and
thinly provision N storage volumes, each of which resides at one of the N different fault domains.

6. The computer system of claim 5, wherein in response to determining that at least one of the N different fault domains is unavailable, the computer system is configured to cache an extra copy of data associated with the write operation in a cache volume that resides at an available fault domain.

7. The computer system of claim 5, wherein the user input further indicates that M copies of data are to be cached during a write operation, where M is a natural number that is greater than 1.

8. The computer system of claim 7, wherein the user input further indicates that a resiliency is R, where R is a natural number, as such:
when a total number of available storage volumes is fewer than M, one or more extra copies of data are cached to achieve the resiliency R.

9. The computer system of claim 7, wherein the computer system is configured to:
determine less than M fault domains are available; and
in response to determining that less than M fault domains are available,
select one or more available fault domains; and
cache one or more extra copies of data associated with the write operation in one or more cache volumes that reside at the one or more available fault domains, such that at least M copies of data associated with the write operation are written.

10. The computer system of claim 1, wherein provisioning the plurality of storage volumes is thinly provisioning the plurality of storage volumes.

11. The computer system of claim 1, wherein the computer system is a storage server configured to provide storage service to a plurality of entities, and a separate resilience policy is configured for each of the plurality of entities.

12. The computer system of claim 1, wherein:
the plurality of cache volumes are provisioned over a first type of storage, and the plurality of storage volumes are provisioned over a second type of storage, and
the first type of storage has a first access speed, and the second type of storage has a second access speed that is slower than the first access speed.

13. A method implemented at a computer system for dynamically maintaining storage resiliency using one or more thinly provisioned cache volumes, the method comprising:
thinly or thickly provisioning a plurality of storage volumes at a plurality of fault domains;
thinly provisioning a plurality of cache volumes at the plurality of fault domains;
performing a write operation in a resilient manner that maintains a plurality of copies of data associated with the write operation, performing the write operation in the resilient manner comprising, for each fault domain in the plurality of fault domains:
allocating a portion of storage in a cache volume at a fault domain;
caching the data associated with the write operation in the portion of storage in the cache volume at the fault domain;
persistently storing the data that is cached in the cache volume in a storage volume at the fault domain; and
after persistently storing the data, deallocating the portion of storage in the cache volume at the fault domain;
in response to determining that at least one fault domain in the plurality of fault domains is unavailable,
allocating an extra portion of storage in a particular cache volume at an available fault domain; and
caching an extra copy of the data associated with the write operation in the extra portion of storage in the particular cache volume; and
in response to determining that the at least one fault domain becomes available, persistently storing the data cached in the portion of storage of the particular cache volume in a storage volume at the at least one fault domain; and
deallocating the portion of storage in the particular cache volume.

14. The method of claim 13, wherein each of the plurality of fault domains is a different node configured to communicate with the computer system over a network.

15. The method of claim 13, wherein the method further comprises receiving a user input that configures a resilience policy.

16. The method of claim 15, wherein the user input indicates that N copies of data are to be persistently maintained, where N is a natural number that is greater than 1.

17. The method of claim 16, wherein the method further comprises, in response to receiving the user input indicating that N copies of data are to be maintained:
provisioning N storage volumes, each of which resides at one of N different fault domains; and
thinly provisioning N storage volumes, each of which resides at one of the N different fault domains.

18. The method of claim 17, wherein the method further comprises, in response to determining that at least one of the N different fault domains is unavailable, caching an extra copy of data associated with the write operation in a cache volume that resides at an available fault domain.

19. The method of claim 17, wherein the user input further indicates that M copies of data are to be cached during a write operation, where M is a natural number that is greater than 1.

20. A computer system-readable hardware storage device having stored thereon computer system-executable instructions that are structured such that when the computer system-executable instructions are executed by a more processor, a computer system is configured to:
provision a plurality of storage volumes at a plurality of fault domains;
thinly provision a plurality of cache volumes at the plurality of fault domains;
perform a write operation in a resilient manner that maintains a plurality of copies of data associated with the write operation, performing the write operation in the resilient manner comprising, for each fault domain in the plurality of fault domains:
allocating a portion of storage in a cache volume at a fault domain;
caching the data associated with the write operation in the portion of storage in the cache volume at the fault domain;

persistently storing the data that is cached in the cache volume in a storage volume at the fault domain; and after persistently storing the data, deallocating the portion of storage in the cache volume at the fault domain;

in response to determining that at least one fault domain in the plurality of fault domains is unavailable, allocate an extra portion of storage in a cache volume at an available fault domain; and cache an extra copy of the data associated with the write operation in the extra portion of storage in the cache volume; and in response to determining that the at least one fault domain becomes available, persistently store the data cached in the extra portion of storage of the cache volume in a storage volume at the at least one fault domain; and deallocate the extra portion of storage in the cache volume.

\* \* \* \* \*